US005576526A

United States Patent [19]

Eisermann

[11] Patent Number: 5,576,526

[45] Date of Patent: Nov. 19, 1996

[54] CLOSURE SYSTEM

[75] Inventor: Armin Eisermann, Velbert, Germany

[73] Assignee: Schulte-Schlagbaum Aktiengesellschaft, Velbert, Germany

[21] Appl. No.: 325,302

[22] PCT Filed: May 8, 1993

[86] PCT No.: PCT/EP93/01129

§ 371 Date: Nov. 7, 1994

§ 102(e) Date: Nov. 7, 1994

[87] PCT Pub. No.: WO93/23644

PCT Pub. Date: Nov. 25, 1993

[30] Foreign Application Priority Data

May 13, 1992 [DE] Germany .......................... 42 15 794.3

[51] Int. Cl.[6] ............................ G06K 5/00; G06K 19/06

[52] U.S. Cl. ............................................ 235/382; 235/492

[58] Field of Search .................................... 235/382, 380, 235/492, 486, 481, 375

[56] References Cited

U.S. PATENT DOCUMENTS

| | | | |
|---|---|---|---|
| 4,204,635 | 5/1980 | Hofmann et al. | 235/382 |
| 4,717,816 | 1/1988 | Raymond et al. | 235/380 |

FOREIGN PATENT DOCUMENTS

| | | | |
|---|---|---|---|
| 0277440 | 8/1988 | European Pat. Off. | 235/382 |
| 2645670 | 10/1990 | France | 235/382 |
| 2050760 | 4/1972 | Germany | 235/382 |
| 3320680 | 12/1984 | Germany | 235/380 |
| 3728072 | 3/1989 | Germany | 235/382 |
| 6108715 | 4/1994 | Japan | 235/382 |
| 8402786 | 7/1984 | WIPO | 235/382 |
| 9429112 | 12/1994 | WIPO | 235/382 |

*Primary Examiner*—Donald T. Hajec
*Assistant Examiner*—Thien Minh Le
*Attorney, Agent, or Firm*—Martin A. Farber

[57] ABSTRACT

A closure system having card keys (K) which are adapted to be issued in coded form, the broad-side surfaces of which are divided into individual fields (E) which can be differently magnetically coded for the individual locks/card-holders and move correspondingly positioned magnetic locking pins (31) as tumblers of the lock (4) into open position; for the broadening, in particular, of their purpose of use, a service station (SA) re-codes data identification individual fields (E1) of the key (K), increasing or decreasing their value, and an evaluation station is provided having a reader for noting and storing these re-codings in association with other codings of the card key (K).

6 Claims, 2 Drawing Sheets

Fig. 2
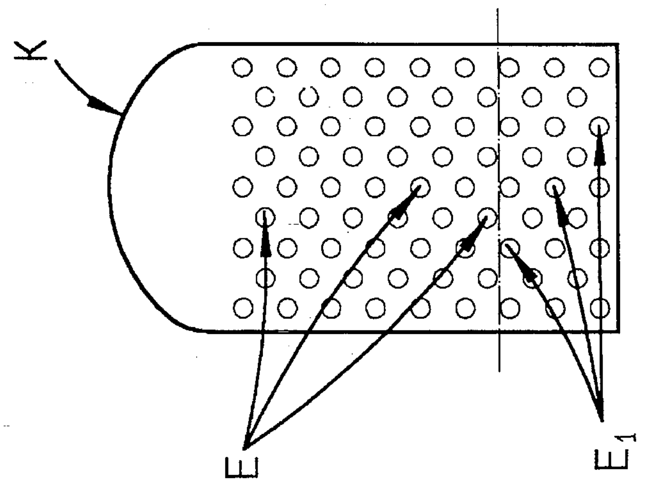
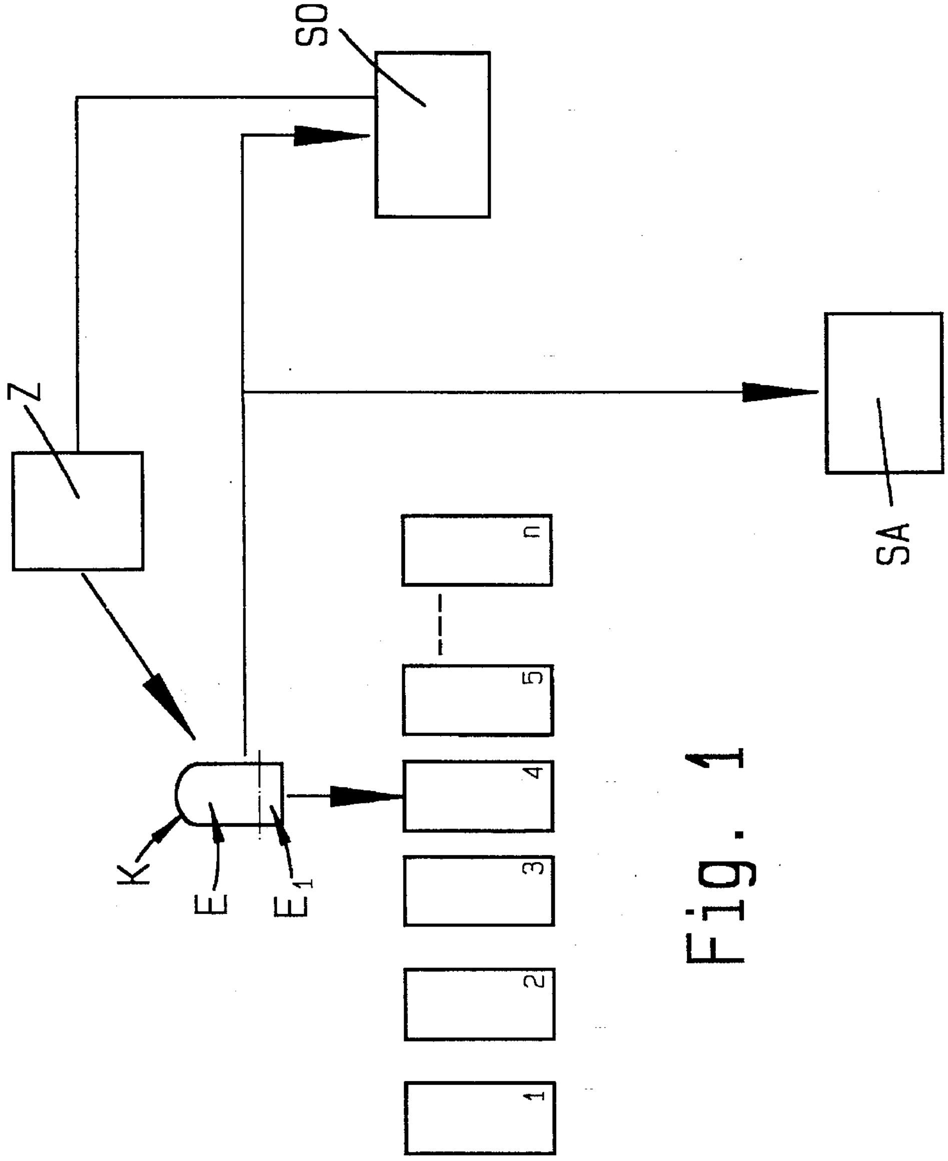
Fig. 1

CLOSURE SYSTEM

FIELD AND BACKGROUND OF THE INVENTION

The present invention related to a closure system.

In the known closure system (Federal Republic of Germany OS 37 28 072), the key bears, in addition to individual fields which can be differently magnetically coded, also a bar code in order to be able to obtain possible services or the like by means of the key. It is also already known to effect the recording of such services in the manner that the closure code of the card key is read at the service station where the dispensing of goods or the accounting for services is effected, and then, via an on-line connection of the service station with an output unit or via some other central unit, to note therein the accounting factor in order to bill it then or later on to the user, for instance upon leaving a public pool or returning a room key to a hotel. In this connection, the closure code formed by the differently coded individual fields may furthermore have a subdivision for the identity of different card holders so that, for instance, two persons who use the same hotel room are billed separately for the services used by them, in the manner that this complete closure-code/card-holder code is forwarded for evaluation over the on-line connection.

The corresponding on-line connection is in many cases rather expensive and unsuitable.

SUMMARY OF THE INVENTION

Therefore, the object of the present invention is to develop a closure system of this type in such a manner that any services can be recorded for accounting by means of the closure-system card code at service stations which can operate in addition to or instead of the on-line-connected service stations.

As a result of the invention a closure system is provided in which services performed are recorded by the card key and can then be accounted subsequently, after evaluation in a central unit or the like, without the service station, where the goods are to be dispensed or the service performed is to be recorded, being connected by a line with the control unit. The recording of the service used is effected rather by a change in the coding of the key in the region of its magnetizable-individual fields which are not used for the closure coding. This also provides a valuable safety factor. The holder of the card key cannot recognize what magnetically codable individual fields form part of the closure code and/or the closure-code/card-holder identity code or to that region which is to be or can be re-coded so as to increase or reduce its value. Attempts at tampering lead with the greatest probability to the card losing the function as a key for the corresponding closure-system lock. A change in the coding which increases the value takes place after the central unit has issued the card key and all services claimed have been subsequently added on the card. A change in the coding which reduces the value takes place when the key has been issued against a deposit and when the services claimed are then deducted by change in the code. This is done, so that upon the return of the key to the central unit, a bill is not issued to the user, and money of the deposit which has not been used is returned to the user. In this connection, the service station reads the code present on the key upon its insertion in order to determine whether and to what extent a change in the coding which increases or decreases the value is to be effected. When the card key is then returned to the central unit, the value of these data-identification individual fields is noted and by simultaneously noting the lock-related code, which may also include card-holder identity codes, the value of the services used is applied to the correct card holder and billed to him. The corresponding change in code, whether an increase or decrease in the value, is in this case restricted to the limit provided. In order not to make the entire evaluation necessary directly upon each insertion of the card key into the central unit, this forwarding of the re-coded data can, in accordance with a special embodiment, also be effected by a service station which, in its turn, bills for and dispenses services, but has the previously known on-line connection to the central unit. Within the central unit and/or such a service station, a neutralizing of the re-coding/data-identification/individual fields of the key can then take place. Similarly, it can be possible for the change in coding to be effected by the insertion of money within the service station. This, in particular, when the remaining amounts which can still be noted as re-codable on the card key are not, for instance, sufficient to provide the full-service charge, or if the user of the card—as the result of a display to this effect at the service station—learns that no further payment for services possible by the re-coding of his key is present as reserve any longer. In this case, the corresponding service station can, in accordance with the invention, also have a blocking device so that, upon insertion of a key which is coded for a given lock, for instance a given hotel room door, but which bears a subsequent closure code for the opening of this lock which, at the same time, places the previous closure code out of action, the card key bearing the previous closure code can no longer be used only after insertion of a card key which changes such closure code, also within the service station.

BRIEF DESCRIPTION OF THE DRAWINGS

With the above and other advantages in view, the present invention will become more clearly understood in connection with the detailed description of a preferred embodiment, when considered with the accompanied drawings, of which:

FIG. 1 is a diagrammatic showing of the closure system of the invention;

FIG. 2 shows a card key looking at the surface of a broad side bearing codable individual fields which are diagrammatically indicated.

DETAILED DESCRIPTION OF THE PREFERRED EMBODIMENT

Figure 3:
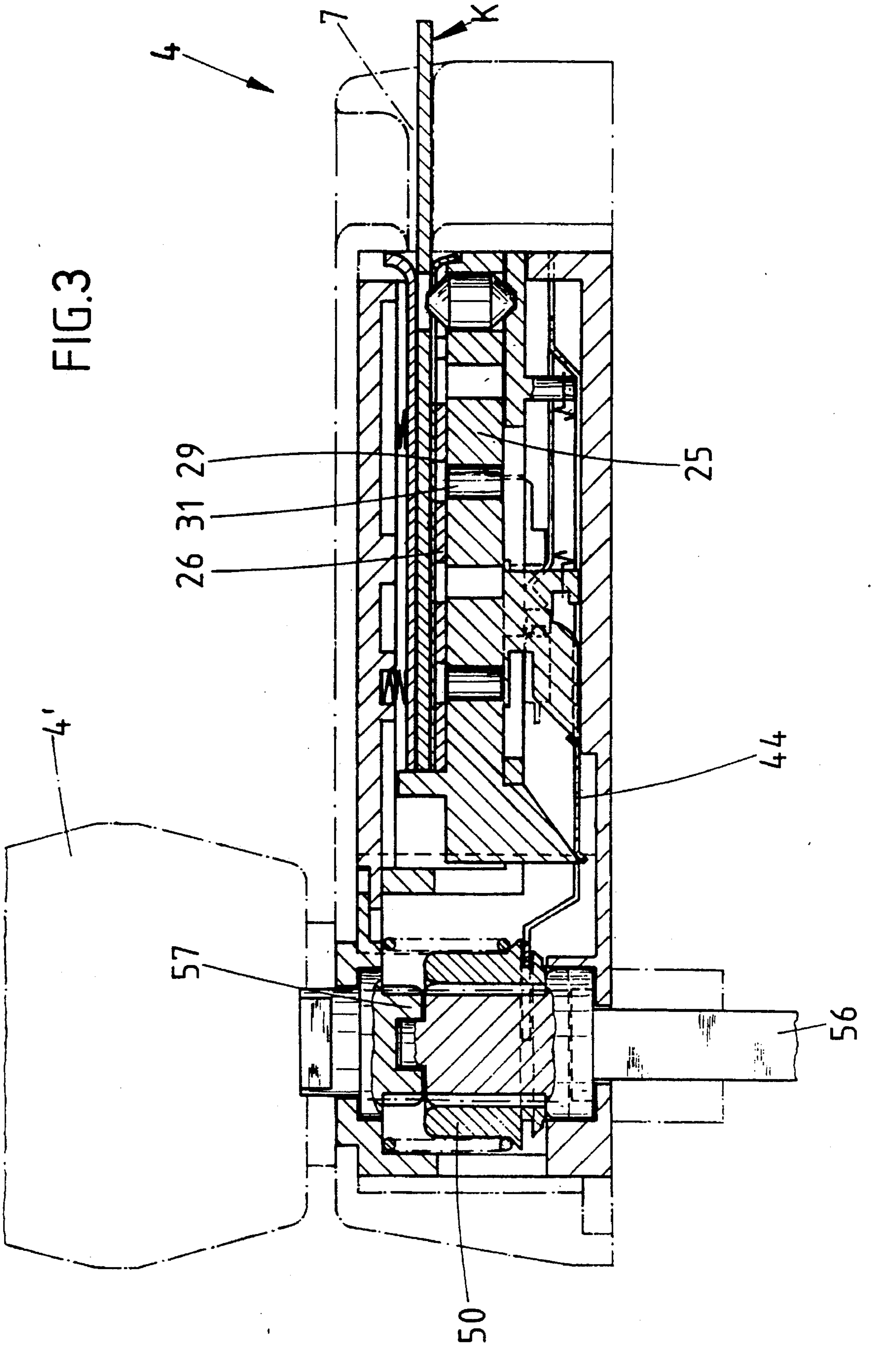
FIG. 3 shows the basic principle of the manner of operation of a lock corresponding to such a card key.

The central unit Z issues the card key K. The surfaces of its broad sides are divided into differently magnetically codable individual fields E. This means that the magnetic field which is incorporated in each case by these individual fields extends in the direction of the thickness of the card key K; therefore, either the magnetic north pole is located on the top and the south pole on the bottom, or vice versa.

The main part of these individual fields E serves first of all to identify the card key K with one of the locks 1—n of, for instance, a hotel. One key fits, for instance, merely the lock 4. Furthermore, the individual fields are so coded that each of them incorporates a given closure code which either belongs permanently to this corresponding lock 4 or else temporarily. In the latter case, the closure code is changed whenever another key K is issued for the same lock 4. If the new key K is then inserted, the code of the lock is automatically changed, namely in accordance with German OS 37 28 072, and the previous closure code becomes invalid. Furthermore, individual fields may also incorporate a card-holder identity, so that, in the event for instance that a room is occupied by several persons, each key holder has an individual code for himself.

This key K can then be inserted, for instance, into a service unit. The unit reads the closure-code/card-holder identity code and thus forwards the services claimed (and dispensing of goods, use of pool, etc.) to the central unit Z where billing for the service is effected subsequently upon return of the key K. This service station is designated SO in the accompanying sketch. In addition to this, there is a completely self-sufficient service station SA, i.e. a service station without on-line connection to the central unit Z. A card key K can be inserted also into said central unit. In order now to record the value of the services claimed, dispensing of goods or the like, a change is effected in the coding of such data-identification individual fields E1 of the key K as are not used as lock-related coding. This change in the code is effected so as to increase or decrease the value. In this connection the service station SA has a reader in order to note the existing status with respect to these individual fields E1. It furthermore has magnetization coils in order to magnetize in a given manner the corresponding fields E1 which are not magnetized at all or to convert fields which have the magnetic south pole on the one broad side into magnetization with the magnetic south pole on the other broad side. If the card key K, after being used one or more times, comes into one or more of such service stations SA which, due to the absence of on-line connections, can also be at greater distances from the hotel, for instance at the hotel beach, and again by returning the re-codeded card key K into the region of the central unit Z, then, by means of the change in coding which has been effected and a corresponding reader in the central unit Z and associated evaluation station which may be a service station SO, the value factor corresponding to the change in coding is determined and assigned to the debtor via the lock-related code (closure code/car-holder identity code).

The manner of operation of the magnetically coded individual fields in the lock 4 can be noted essentially from FIG. 3. It can be noted there that the card key K can be inserted into a shaft 7 in the lock 4. Magnetic tumblers 31 are moved by the correspondingly coded individual fields E into a position of release, i.e. they come out of corresponding blocking openings 29 in a blocking plate 26. Upon the use of the correct key K, the slide 25 can thereby be displaced axially; this displacement causes the swinging of a leaf spring 44. The latter displaces a coupling bushing 50 on the mandrel 57 of a lock-actuating handle 4'. In the displaced position of the slide 25, the handle 4' is thereby connected to the latch/bolt of a mortise lock of the door and the door can accordingly be opened. If it had been attempted, for instance, to change the value-determining re-coding of the individual fields E1 and if in this connection even only one of the lock-related codings had been changed, then the key K could no longer be used for the closing of the lock 4 associated with it.

I claim:

1. A closure system comprising a central unit, card keys adapted to be issued from said central unit in coded form, a broad side surface of said card keys are divided into first individual fields which can be differently magnetically coded with closure codes for individual locks and second individual fields which can be magnetically coded with magnetization polarity, at least one lock, the lock having magnetic locking pins serving as tumblers of the lock, wherein said card keys are insertable into a shaft of the lock in which a part of the first coded individual fields move correspondingly positioned magnetic locking pins into an open position, an off-line service station with a second card key reading device, said off-line service station is unconnected to said central unit, said second individual fields of the card keys via their magnetization polarity is readable by the second reading device also incorporating data identification for accounting, without cash, of services and/or goods used by the card-holders at said service station, and an evaluation station connected with the central unit, the service station comprising means for re-coding the data identification of said second individual fields of the card keys so as to increase or reduce their value, and said evaluation station has a first card key reading device, for noting and storing said re-coding of said second individual fields in association with other codings of the card keys when said card keys respectively are returned to said central unit for reading by said first card key reading device and for evaluation by said evaluation station.

2. A closure system according to claim 1, wherein said first individual fields contain lock-related codes which are read by said first reading device for identification with data of said coding of said second individual fields.

3. A closure system according to claim 1, wherein the evaluation station is a service station which is connected on line to said central unit and which transfers stored data on-line to the central unit.

4. A closure system according to claim 1, wherein the evaluation station neutralizes the re-coded fields of the card keys respectively after said storing.

5. A closure system according to claim 1, wherein the re-coding can be effected within the service station by entry of money.

6. A closure system according to claim 1, wherein the lock-related codes include lock closure codes itself.

* * * * *